Patented Oct. 27, 1925.

1,558,888

UNITED STATES PATENT OFFICE.

ROBERT E. JONES, OF LONGMONT, COLORADO.

BAKING POWDER.

No Drawing.   Application filed February 14, 1925.   Serial No. 9,346.

*To all whom it may concern:*

Be it known that I, ROBERT E. JONES, a citizen of the United States of America, residing at Longmont, county of Boulder, and State of Colorado, have invented certain new and useful Improvements in Baking Powder; and I do declare the following to be a full, clear, and exact description of the invention, such as will enable others skilled in the art to which it appertains to make and use the same.

This invention relates to improvements in the composition of baking powders.

It is the object of this invention to produce a baking powder which, in addition to the properties common to all baking powders, shall also convert some of the starches into sugar, thereby sweetening the food and reducing the work of the digestive apparatus.

It is well known that the diet commonly used contains an excessive amount of starch which overburdens the starch digesting properties of the digestive apparatus, thereby causing fermentative dyspepsia which is often accompanied with diarrhea.

It is evident that if the starch foods are prepared in such a manner that a portion of the starch would be converted into sugar, it would decrease the work of the physiological digestion to that extent, and thereby prevent the evil effects of fermentation.

In the process of digestion of starches, they are converted into soluble starches, the dextrins, and finally into maltose and, in a limited degree, into dextrose by the action of the diastatic ferments, which in the human physiology comprise ptyalin and amylopsin. Starches can also be converted into sugar by the action of taka-diastase, a substance that has the power to liquefy, in ten (10) minutes, three hundred times its own weight of starch. The action of taka-diastase on starch is exactly comparable with the action of the ptyalin of the saliva and to a certain extent with that of the amylopsin of the pancreatic juice, and the products of the taka-diastase reaction are practically identical with those resulting from the diastatic enzymes normally present in the human economy.

It is evident that if we add taka-diastase in proper amounts to the starchy foods an amount of starch directly proportional to the amount of diastase used will be converted into sugar. I have found that if the taka-diastase is added to the baking powder employed in making cakes, biscuits, etc., that very good results may be obtained with no extra amount of labor.

The baking powder that I have found suitable for the purpose under consideration has the following formula:

Calcium acid phosphate_____ 5.25 ounces.
Sodium bicarbonate_____ 3 ounces.
Cornstarch_____ 3 ounces 5.25 drachms.
Taka-diastase_____ .75 drachm.

The quantities being given in apothecary weights and together form one pound of twelve ounces.

The baking powder is employed in the usual way by using one teaspoonful to a pint of flour. In the composition given above one teaspoonful of baking powder contains fifteen thirty-seconds (15/32) of one grain of taka-diastase which has the power of liquefying about one hundred and forty (140) grains of starch. After the dough has been mixed it should be allowed to stand ten (10) minutes before it is placed in the oven. A sufficient amount of starch will then be converted into sugar to impart a sweetened flavor (automatically derived from its own substance) and which makes the product more palatable for those people who prefer the sweeter foods.

The action of the taka-diastase is arrested when it is subjected to a temperature of two hundred degrees Fahrenheit, but before this temperature is attained, a sufficient amount of the starches will have been converted into sugar to sweeten the food and to materially reduce the amount of starch to be digested. If any of the diastase remains unimpaired after baking it will resume its activity when the food reaches the stomach and the digestion of the starches recommences and continues for about an hour when the action of the diastase is stopped by the free acids that have by this time increased in sufficient quantity to inhibit the diastatic action.

It is, of course, not my intention to convert all of the starches into sugar, although the take-diastase is capable of doing this under ideal conditions, but to convert a sufficient amount of the starches to produce enough sugar to sweeten the product.

The cornstarch that I employ in my baking powder is merely a dilutant and is added so that the powder may be conveniently measured by spoonfuls. If the cornstarch were omitted, as it may be if desired, the measuring of the powder would become a delicate operation, whereas when diluted with cornstarch this can be easily done.

Having now described my invention, what I claim as new is:

1. A baking powder comprising in its composition taka-diastase.

2. A baking powder comprising calcium acid phosphate, sodium bicarbonate and taka-diastase.

3. A baking powder comprising calcium acid phosphate, sodium bicarbonate, cornstarch and taka-diastase.

4. A baking powder having seventy-five hundredths (.75) of a drachm of taka-diastase to each twelve (12) ounces of weight.

5. A baking powder having the following composition, calcium acid phosphate five and twenty-five hundredths (5.25) ounces, sodium bicarbonate three (3) ounces, cornstarch three (3) ounces and five and twenty-five hundredths (5.25) drachms and taka-diastase seventy-five hundredths (.75) of one drachm.

In testimony whereof I affix my signature.

ROBERT E. JONES.